S. C. TUSSING.
MACHINE FOR TOPPING AND HARVESTING BEETS.
APPLICATION FILED DEC. 8, 1917.
1,282,657.
Patented Oct. 22, 1918.
3 SHEETS—SHEET 1.
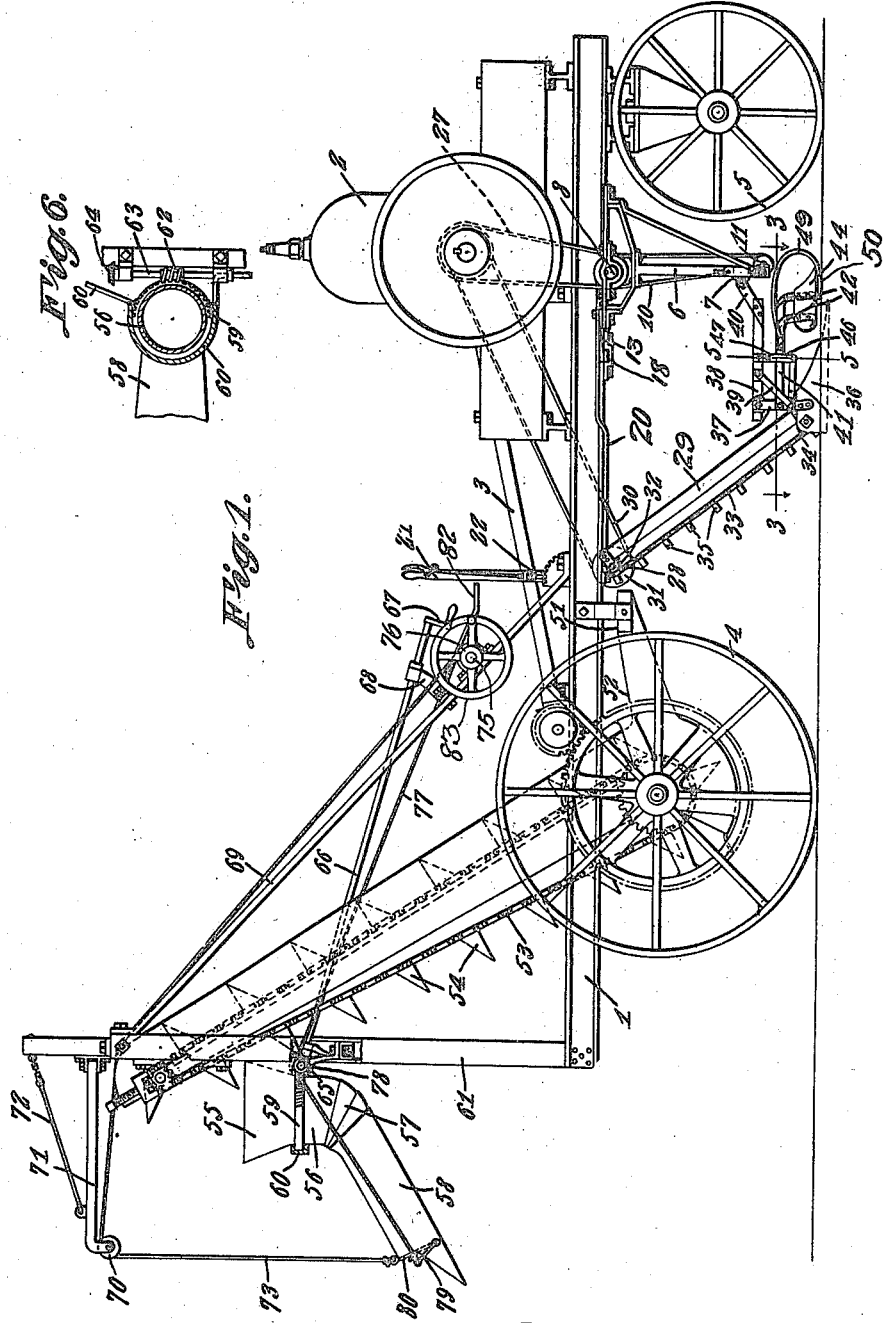
Witnesses
S.C. Tussing, Inventor
by
Attorneys

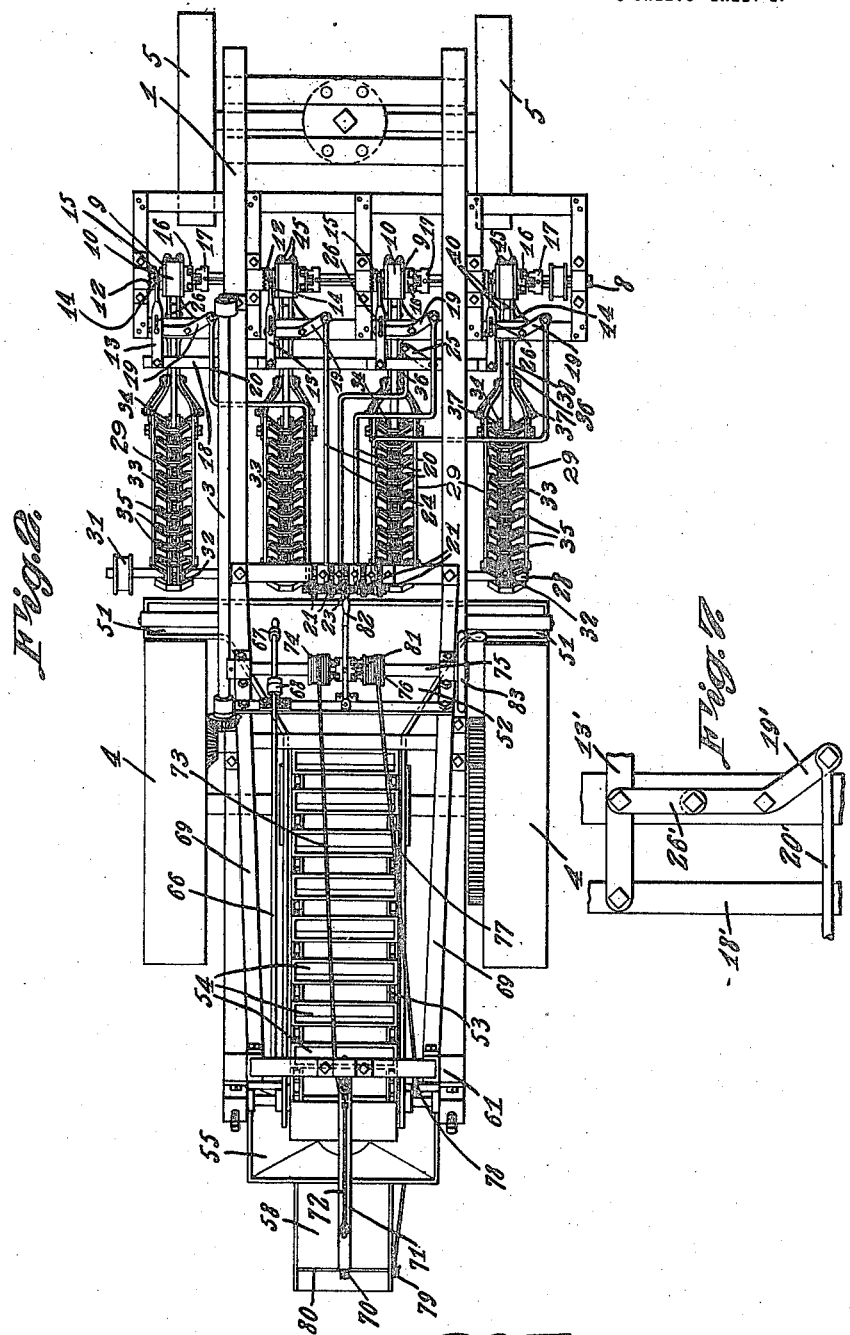

S. C. TUSSING.
MACHINE FOR TOPPING AND HARVESTING BEETS.
APPLICATION FILED DEC. 8, 1917.
1,282,657. Patented Oct. 22, 1918.
3 SHEETS—SHEET 3.
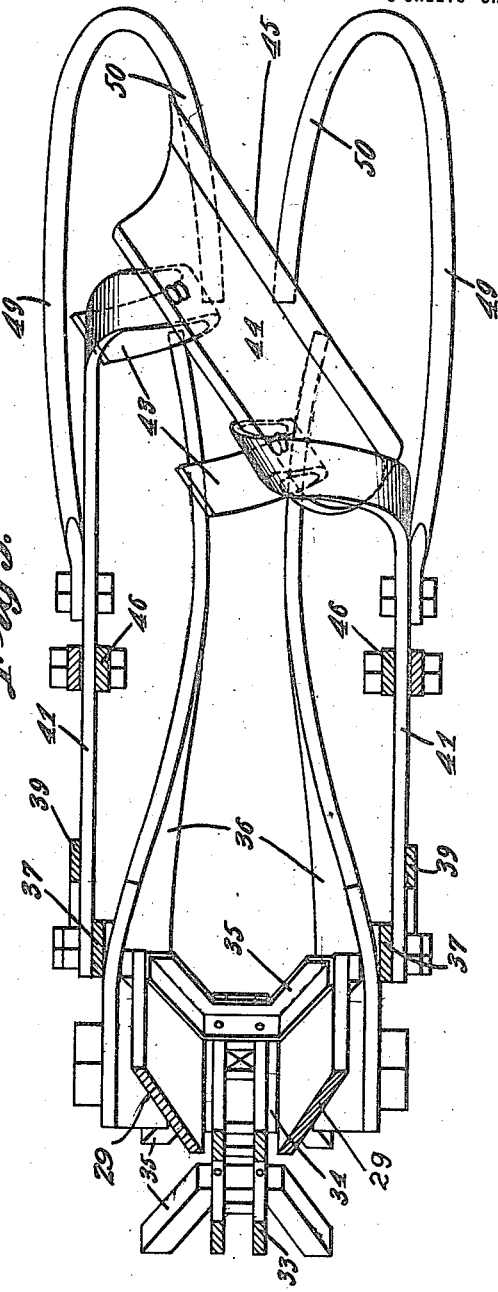
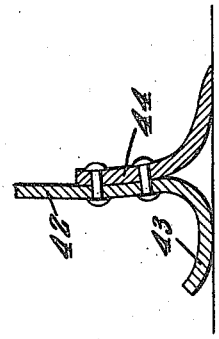
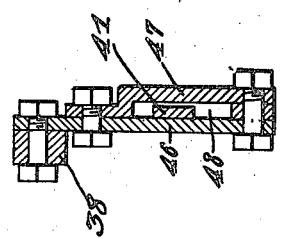
Witnesses
S. C. Tussing, Inventor
by ......... Attorneys

UNITED STATES PATENT OFFICE.

SAMUEL C. TUSSING, OF FINDLAY, OHIO.

MACHINE FOR TOPPING AND HARVESTING BEETS.

1,282,657.  Specification of Letters Patent.  Patented Oct. 22, 1918.

Application filed December 8, 1917. Serial No. 206,232.

*To all whom it may concern:*

Be it known that I, SAMUEL C. TUSSING, a citizen of the United States, residing at Findlay, in the county of Hancock and State of Ohio, have invented a new and useful Machine for Topping and Harvesting Beets, of which the following is a specification.

This invention relates to machines for topping and harvesting beets, one of the objects of the invention being to provide a topping blade of novel form so arranged as to direct the severed crowns and tops laterally out of the path of the machine, a gage being combined with this topping blade whereby the proper topping of the beets is insured irrespective of the sizes of the beets or the distances they project above the surface of the ground.

Another object is to provide a machine of this character utilizing a gang of topping devices which can be raised and lowered independently or simultaneously as preferred, the shifting mechanism being constantly under the control of the operator.

A further object is to provide means whereby the beets can be dug immediately subsequent to the topping operation, these beets being directed onto separate elevators which, in turn, discharge the beets onto a mean elevator operating to deliver the beets to a discharge element.

A further object is to provide in a beet harvester, a discharge element or spout which can be adjusted angularly both vertically and horizontally thus to deliver the topped beets in any direction from the machine, there being a valve combined with the delivery spout or chute for controlling the discharge of the beets.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of the machine.

Fig. 2 is a plan view, the engine being removed.

Fig. 3 is an enlarged section on line 3—3 of Fig. 1.

Fig. 4 is an enlarged vertical section through a portion of one of the topping blades and one of its runners.

Fig. 5 is an enlarged section on line 5—5 of Fig. 1.

Fig. 6 is a horizontal section through the delivery hopper and showing part of the mechanism employed for rotating it.

Fig. 7 is a detail view of a modified form of clutch operating means.

Referring to the figures by characters of reference 1 designates the frame of the machine upon the front portion of which is mounted a motor 2 adapted to operate drive mechanism shown generally at 3 for propelling the rear wheels 4 of the machine.

Depending from the frame 1 close to but back of the front wheels 5 is a series of hangers 6 on each of which is mounted a sleeve 7. A shaft 8 is journaled on the frame 1 and above the hangers and extends transversely of the machine. Loosely mounted on this shaft directly above each of the hangers is a spool 9 to which is connected an intermediate portion of a belt 10 or the like one end of which is secured to the upper end of the sleeve 7 while the other end extends under a guide sheave 11 carried by the lower end of said portion of the hanger 6 and extends upwardly to the lower end of the sleeve 7. Thus it will be seen that when the spool 9 is turned in one direction the sleeve 7 connected thereto will be moved upwardly along its hanger and, when the spool is turned in the opposite direction, said sleeve will be drawn downwardly forcibly.

Each of the spools 9 has a grooved hub 12 engaged by one end of a shifting lever 13 and the free end of each of these hubs is toothed as shown at 14 for the purpose of engaging a correspondingly toothed member 15 which is fixedly mounted and extends around the shaft. The opposite end of each of the hubs of the spools 9 constitutes a clutch member 16 which is normally spaced from but is adapted to engage the clutch member 17 secured to and revoluble with the shaft 8. It will be noted that under normal conditions all of the spools 9 are held against rotation because the toothed ends 14 of their hubs are in engagement with the fixed toothed members 15. However, by shifting the lever 13 in one direction, the hubs of the spools can be disengaged from the toothed members 15 so as to couple together the clutch members 16 and 17 and thus cause the spools to rotate the shaft 8.

All of the levers are pivotally connected to a movable cross bar 18 and each of the levers 13, between its ends, is slidably and pivotally engaged by one end of a bell crank lever 19 the other end of which is connected by a rod 20 to a shifting lever 21 located where it can be reached readily by the operator. Each shifting lever may be provided with pawl and ratchet mechanism indicated generally at 22 in Fig. 1, whereby the lever and the parts operated thereby can be secured against movement. One of the levers 21 or the parts controlled thereby is provided for the shifting mechanism of each of the spools 9. An additional lever 23 is connected by a rod 24 to a link 25 one end of which is pivotally connected to the cross bar 18 as shown in Fig. 2.

It will be apparent that when lever 23 is locked against movement and any one of the levers 21 is pushed forwardly, said lever will pull, through its rod 20, upon its lever 19 and cause one end of the lever to slide and swing within a slot 26 in the engaged lever 13, thus causing said lever 13 to swing about its pivotal connection with the bar 18 and shift the spool 9 laterally out of engagement with the toothed member 15 and into engagement with the clutch member 17. In this way it will be seen that any one of the spools 9 can be coupled to the shaft 8 independently of the others and by causing this shaft to rotate in one direction or the other, the belts 10 or cables connected to the spools, will be raised or lowered as desired, the other belts or cables remaining stationary. However, by leaving the levers 21 locked but pushing lever 23 forwardly, rod 24 will pull on the link 25 and cause said link to thrust the bar 18 transversely of the machine so as to swing all of the levers 13 simultaneously to shift the spools 9 in one direction. By moving lever 23 in the opposite direction all of the spools will be shifted in the opposite direction. Thus it will be seen that by providing this arrangement of levers and parts controlled thereby, separate or simultaneous movement of the spools 9 can be effected for the purpose of separately or simultaneously raising or lowering the sleeves 7. Any suitable means may be employed for rotating shaft 8 in either direction, one means being a belt 27 operated by mechanism, not shown, driven by the engine 2 and which mechanism will permit the shaft 8 to rotate slowly in either direction. It is not deemed necessary to show any such mechanism in detail.

Extending transversely of the frame 1 back of the hangers 6 is a shaft 28 from which are hung frames 29 adapted to swing upon the shaft. This shaft is adapted to be rotated by a belt 30 engaging a pulley 31 on the shaft which shaft is driven by the motor 2. Connected to the shaft are sprockets 32 which drive endless belts 33 each of which is arranged within one of the frames 29 and is mounted at its lower end on a sprocket 34. The belts 33 have angular cleats 35, the sides of which diverge outwardly away from the belts as shown particularly in Figs. 2 and 3. The lower end of each of the frames 29 is connected to the rear portion of a plow or digger 36 to which is fixedly secured a standard 37 the upper end of which is fixedly connected to a beam 38. A brace 39 may be provided for the beam and standard. The forward end of the beam 38 is connected by a tongue 40 to one of the sleeves 7.

Bars 41 are pivotally connected to the standard 37 and extend forwardly over the digger or plow 36, one of these bars being provided for each standard 37, it being understood that, as shown in Fig. 3, the standards 37 are arranged in pairs. The forward ends of the bars 41 are extended downwardly as at 42 and their lower ends are curved rearwardly and upwardly to provide runners 43. To the downwardly extending portions 42 is attached a topping blade 44 curved downwardly and forwardly and having its cutting edge obliquely disposed relative to the path of movement of the machine, as shown at 45 in Fig. 3.

Downwardly diverging hangers 46 extend from the sides of the beam 38 and secured to the outer sides of these hangers are guide straps 47 forming spaces 48 in which the bars 41 are adapted to slide.

Secured to the forward portion of each of the bars 41 is a gage rod 49 which is curved forwardly, downwardly and rearwardly, the rearwardly extending portion constituting a runner as indicated at 50. The runners on the two gage rods are spaced apart such a distance as to pass along each side of a top of a beet and at the same time ride upon the crown of a beet.

It is to be understood that the parts heretofore described, to wit, the elevating belt 33, the digging plow 36, the topping blade 44, and the gage rods 49 are arranged below and in the rear of one of the hangers 6 and similar mechanism is provided for each of the hangers.

All of the elevating belts 33 are adapted to discharge material into a transverse trough 51 carried by the frame 1 which trough directs material into a hopper 52 which, in turn, discharges beets onto an endless conveyer 53 having buckets 54 extending transversely thereof. This conveyer is adapted to be operated in any manner desired and when the buckets reach the upper end of the conveyer they dump their contents into a hopper 55 having a cylindrical outlet 56 connected by a jointed elbow 57 with a delivery spout 58. A gear ring 59 is secured to the cylindrical outlet 56 and is mounted in a support 60 fixedly connected to a mast 61 upstanding from the rear end of the frame 1. This ring 59 meshes with a worm 62 arranged on a shaft 63 which has a gear 64. Said gear is adapted to receive motion from a gear 65 secured to one end of a shaft 66. Said shaft extends downwardly and forwardly to a point where it can be reached conveniently by the operator, there being a crank 67 or the like thereon to facilitate the rotation of the shaft. Said shaft may be journaled in a bracket 68 extending from a brace 69 which is fastened to the frame 1 and to the mast 61. Obviously by rotating shaft 66 the hopper 55 can be rotated, thus to swing the delivery spout 58 to one side or the other.

A sheave 70 is supported by an arm 71 extending rearwardly from the rear portion of the mast 61, said arm being adapted to swing laterally and being provided with a brace 72. A cable 73 is extended over the sheave 70 and is secured at one end to the delivery end of the spout 58 while its other end extends through a spool 74 loosely mounted on a transverse shaft 75. Another spool 76 is loosely mounted on said shaft and connected to one end of a cable 77 the other end of which is passed over a guide sheave 78 and is secured to an arm 79 connected to a hinged valve 80 mounted in the discharge end of the spout 58. A clutch member 81 is threaded on the shaft 75 and between spools 74 and 76 and is adapted to be shifted by a lever 82 so as to engage one or the other of the spools and couple the same to the shaft 75. A hand wheel 83 is connected to this shaft so that the same can be rotated readily.

It will be apparent that when the machine is propelled forwardly along a row or rows of beets the runners 50 will move over the crowns of the beets on opposite sides of the tops, thus elevating the topping blade 44 so that it will sever the crown from its beet, the severed top being deflected laterally out of the path of the machine. After a beet has been topped, the digging plow 36 following the topping blade will lift the beet out of the ground and direct it onto the elevator in the rear of the plow. All of the elevators will operate simultaneously to convey the topped beets upwardly to the trough 51, which, in turn, will direct them into the hopper 52 and thence to the elevator 53. This elevator will direct the beets into the hopper 55 and thence to the spout 58 which, by the mechanism hereinbefore described, can be raised and lowered and can be swung to the right or to the left. By means of the cable 77 the valve 80 can be opened when desired to release the beets within the spout 58. One or the other of the spools 74 and 76 can be rotated so as to wind the cable by shifting lever 82 in one direction or the other and then rotating the hand wheel 83.

Instead of providing the slotted members 13 slidably engaged by the ends of the levers 19, the structure shown in Fig. 7 may be applied. In other words each of the levers 19' may be connected by a link 26' to a lever 13' so that when the lever 19' is pulled in one direction it will transmit motion through its link 26' to the lever 13'.

What is claimed is:—

1. In a beet topper and harvester the combination with a digger having a beam, and a wheel supported frame extending over the digger, of means for raising and lowering the digger, comprising a hanger depending from the frame, a sleeve slidable thereon and connected to the beam, a belt having its ends connected to the sleeve, a guide for the belt below the sleeve, a spool engaged by the upper portion of the belt, and means under the control of the operator for operatively connecting the spool to or for disconnecting it from a driving mechanism.

2. In a beet topper and harvester the combination with a wheel supported frame, of hangers, sleeves slidable thereon for engagement with the beams of separate diggers, a transverse shaft, spools loosely mounted thereon, means for transmitting motion to the shaft, belts connecting the spools to the respective sleeves, means for holding the spools against rotation, separate means under the control of the operator for releasing the respective spools from their holding means and coupling them to the transverse shaft, and means under the control of the operator for simultaneously coupling all of the spools to or uncoupling them from the shaft to raise or to lower the sleeves.

3. In a beet topper and harvester the combination with a wheel supported frame, of hangers, sleeves slidable thereon, a transverse shaft, means for driving the shaft, spools loosely mounted on the shaft, coöperating means upon the spools and frame for locking the spools against rotation with the shaft, lifting belts upon the spools and connected to the respective sleeves, a cross bar, levers connecting the bar and spools, actuating levers engaging the respective connecting levers, separate means for shifting the actuating levers to operate the connecting levers thereof and shift the spools upon the shaft, means on the shaft for engagement by the shifted spools to couple the spools to the shaft, and means for shifting the bar to simultaneously actuate the connecting levers and couple the spools simultaneously to the shaft.

4. In a beet topper and harvester the combination with a digger, a beam extending therefrom, and means for raising and lowering the beam, of hangers depending from the beam, bars pivotally connected to the standard of the digger and extending forwardly past and guided by the hangers, an obliquely disposed topping blade connected to the front ends of the bars and movable with the bars upwardly and downwardly in front of the digger, and a gage rod connected to each bar, said rods being curved forwardly, downwardly and rearwardly to form runners.

In testimony that I claim the foregoing as my own, I have hereto affixed my signature in the presence of two witnesses.

SAMUEL C. TUSSING.

Witnesses:
B. F. BOLTON,
RAY E. TUSSING.